United States Patent
Jonsson

(10) Patent No.: US 8,059,739 B2
(45) Date of Patent: Nov. 15, 2011

(54) METHOD AND APPARATUS FOR CORRECTING DATA TRANSMISSION ERRORS

(75) Inventor: Elias Jonsson, Malmö (SE)

(73) Assignee: Telefonaktiebolaget LM Ericsson, Stockholm (SE)

(*) Notice: Subject to any disclaimer, the term of this patent is extended or adjusted under 35 U.S.C. 154(b) by 911 days.

(21) Appl. No.: 11/446,734

(22) Filed: Jun. 5, 2006

(65) Prior Publication Data

US 2007/0280368 A1     Dec. 6, 2007

(51) Int. Cl.
*H04L 5/12*     (2006.01)
(52) U.S. Cl. ........ 375/262; 329/318; 329/349; 332/107; 332/123; 332/159; 375/346; 375/E1.03; 375/E1.031
(58) Field of Classification Search .................... 375/262
See application file for complete search history.

(56) References Cited

U.S. PATENT DOCUMENTS

| | | | |
|---|---|---|---|
| 6,404,760 B1 | 6/2002 | Holtzman et al. | |
| 6,700,867 B2* | 3/2004 | Classon et al. ................ | 370/216 |
| 2004/0013105 A1 | 1/2004 | Ahmavaara et al. | |
| 2005/0094603 A1 | 5/2005 | Kim et al. | |
| 2005/0138530 A1 | 6/2005 | Huang et al. | |
| 2005/0163041 A1 | 7/2005 | Ikram et al. | |
| 2005/0166129 A1 | 7/2005 | Yano et al. | |
| 2005/0190849 A1 | 9/2005 | McNamara | |
| 2005/0235190 A1 | 10/2005 | Miyazaki et al. | |
| 2006/0018259 A1 | 1/2006 | Kadous | |

FOREIGN PATENT DOCUMENTS

| | | |
|---|---|---|
| EP | 1 294 120 A1 | 3/2003 |
| EP | 1 551 126 A1 | 7/2005 |
| WO | WO 2004/028063 A1 | 4/2004 |

OTHER PUBLICATIONS

Kim et al; Adaptive Hybrid Serial Parallel Interference Cancellation in CDMA Systems; Sep. 29-Oct. 2, 1996; IEEE Universal Conference on Personal Communications; vol. 1; pp. 341-344.*

Foshini, "Layered Space-Time Architecture for Wireless Communication in a Fading Environment When Using Multi-Element Antennas," Bell Labs Technical Journal, Sep. 21, 1996, pp. 41-59, vol. 1, No. 2, XP000656005.

Moshavi, "Multi-User Detection for DS-CDMA Communications," IEEE Communications Magazine, Oct. 1996, pp. 124-136, vol. 34, No. 10, XP000694489.

* cited by examiner

*Primary Examiner* — David C. Payne
*Assistant Examiner* — Adolf Dsouza
(74) *Attorney, Agent, or Firm* — Coats & Bennett, P.L.L.C.

(57) ABSTRACT

A wireless communication device corrects data transmission errors caused by the simultaneous transmission of multiple streams of data in a Multiple-Input Multiple-Output (MIMO) network. The wireless communication device corrects data transmission errors by removing the signal contribution associated with one or more received signal components from a corresponding received composite signal, thus allowing the remaining components to be decoded relatively free from the signal contribution of the removed components. In one embodiment, the wireless communication device comprises a plurality of antennas and a baseband processor. The antennas are configured to receive a composite signal having a plurality of received signal components. The baseband processor is configured to obtain decoding quality metrics for individual ones of the received signal components, form regenerated received signal components for the received signal components having satisfactory decoding quality metrics, and remove the regenerated received signal components from the received composite signal.

31 Claims, 7 Drawing Sheets

METHOD AND APPARATUS FOR CORRECTING DATA TRANSMISSION ERRORS

BACKGROUND

The present invention generally relates to Multiple-Input Multiple-Output (MIMO) based wireless communication receivers, and particularly relates to correcting data transmission errors by MIMO-based wireless communication receivers.

The acronym 'MIMO' refers to a broad spectrum of wireless communication technologies that incorporate multiple transmit and receive antennas for improving data transmission performance. Particularly, MIMO-based wireless communication systems improve spectral efficiency by combining temporal processing with spatial processing, thus exploiting the spatial dimension of a wireless communication channel. For example, MIMO-based wireless communication systems may improve data transmission rates by employing a spatial multiplexing technique. In addition, the adverse effects associated with channel fading may be reduced by employing space-time diversity coding schemes.

Wireless communication systems having a rich multi-path fading channel environment may incorporate multiple transmit and receive antennas for improving system performance. For example, cellular-based systems using Wideband Code Division Multiple Access (WCDMA) technology may utilize multiple transmit and receive antennas. Likewise, Wireless Local Area Networks (WLAN) using the Orthogonal Frequency Division Multiplexing (OFDM) access technology may also utilize multiple transmit and receive antennas. On the transmit side of a conventional MIMO-based system, turbo encoded data is interleaved and de-multiplexed into distinct streams of data, where each data stream corresponds to a particular spreading code and transmit antenna combination. The spreading codes may be re-used across transmit antennas, and each transmit antenna may send a unique pilot code to assist receiver synchronization and channel estimation. On the receive side, transmitted data streams arrive superimposed at each receive antenna. As such, a composite signal received by a plurality of receive antennas may comprise various delay and/or phase shifted instances of the same data streams, e.g., various instances of the same WCDMA or OFDM symbol streams.

Although MIMO-based wireless communication systems may improve system performance as compared to single-antenna systems, they still experience data transmission errors due to channel-induced noise and interference. Interference may arise in a MIMO-based system due to simultaneously transmitted streams of data interfering with each other. For example, in an OFDM-based system, simultaneously transmitted streams of data may use the same frequency tone, also referred to as sub-carrier frequency. Alternatively, in a WCDMA-based system, simultaneously transmitted streams of data may use the same channelization codes.

A conventional scheme for correcting data transmission errors in MIMO-based systems is HARQ—Hybrid Automatic Repeat Request. HARQ exploits the high coding gain associated with Forward Error Correction (FEC) and the rate flexibility associated with the Automatic Repeat Request (ARQ) protocol. HARQ utilizes physical layer acknowledgement signaling between transmitters and receivers to facilitate re-transmission of erroneously received data. In addition, re-transmitted data may be combined with previously received data, thus improving data decoding reliability.

Two predominant conventional HARQ-based combining schemes are Chase combining and Incremental Redundancy (IR). Chase combining is a reduced-complexity technique whereby each erroneously received data packet or stream is re-transmitted. On the receive side, the re-transmitted data is combined with the corresponding previously received data. Alternatively, the IR combining technique does not retransmit entire coded data packets or streams. Instead, a wireless transmitter incrementally sends additional redundant information, e.g., parity bit, to a corresponding receiver if data decoding fails. The receiver then uses the redundant information to improve decoding of the erroneously decoded data. Regardless of the particular combining scheme, conventional HARQ-based error correction techniques utilize the retransmission of data to correct data transmission errors.

SUMMARY

According to the methods and apparatus taught herein, a wireless communication device corrects data transmission errors caused by the simultaneous transmission of multiple streams of data in a Multiple-Input Multiple-Output (MIMO) network. In one embodiment, the wireless communication device corrects data transmission errors by removing the signal contribution associated with one or more received signal components from a corresponding received composite signal, thus allowing the remaining components to be decoded relatively free from the signal contribution of the removed components. The wireless communication device removes a component of a received composite signal by regenerating the component signal and subtracting the regenerated component signal from the received composite signal. The wireless communication device determines which signal components to regenerate based on a decoding quality metric such as cyclic redundancy check values, SIR, or a dynamic range of demodulated soft bit values or decoded data values.

In one embodiment, the wireless communication device comprises a plurality of antennas and a baseband processor. The antennas are configured to receive a composite signal having a plurality of received signal components. The baseband processor is configured to obtain decoding quality metrics for individual ones of the received signal components, to form regenerated received signal components for the received signal components having satisfactory decoding quality metrics, and to remove the regenerated received signal components from the received composite signal. In some embodiments, only successfully decoded received signal components are regenerated. In other embodiments, incorrectly decoded received signal components having acceptable decoding quality metrics are also regenerated.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
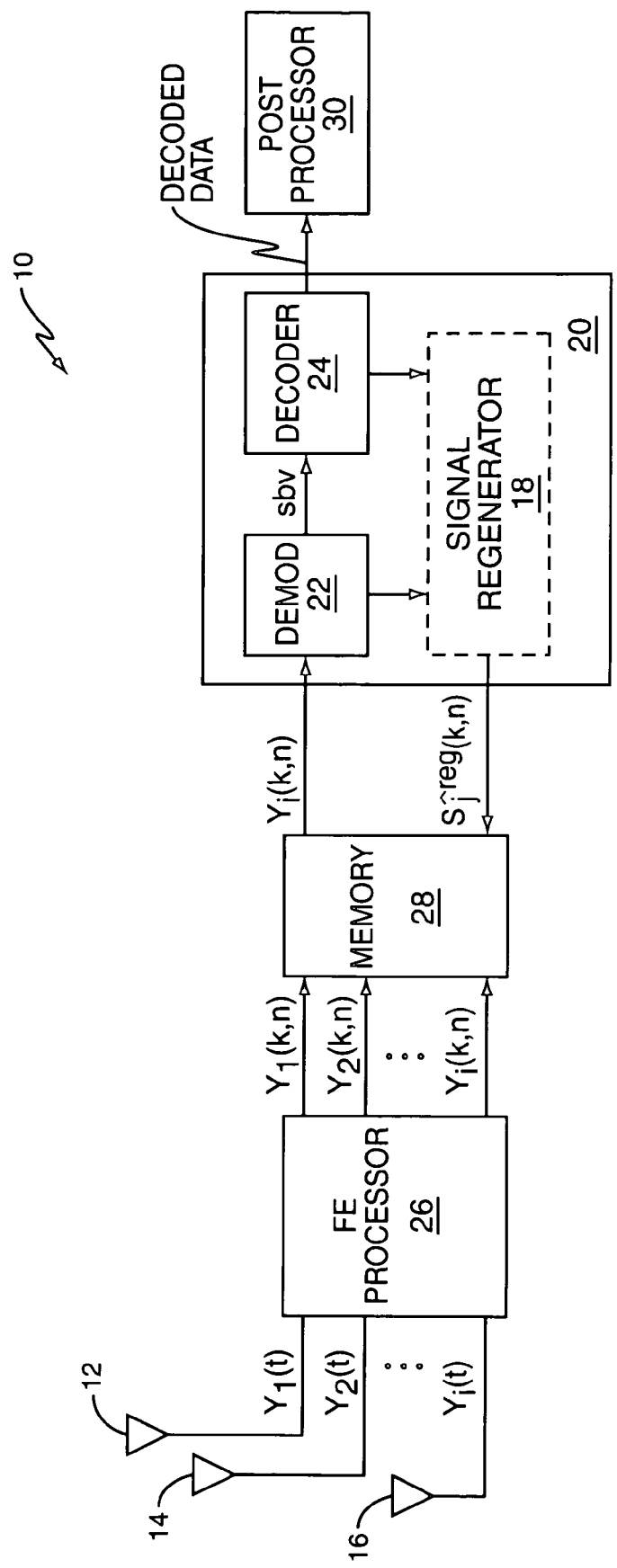
FIG. 1 is a block diagram of an embodiment of a Multiple-Input, Multiple-Output (MIMO) based wireless communication receiver.

FIG. 1 illustrates a Multiple-Input Multiple-Output (MIMO) based wireless communication receiver 10 that corrects data transmission errors caused by the simultaneous transmission of multiple streams of data in a MIMO network. Transmitted data streams arrive superimposed at each receive antenna 12-16 of the MIMO-based receiver 10. As such, a composite signal received by the receive antennas 12-16 may comprise various instances of the same data streams, e.g., various instances of the same Orthogonal Frequency Division Multiplexing (OFDM) or Wideband Code Division Multiple Access (WCDMA) symbol streams. In an OFDM embodiment, the receiver 10 corrects data transmission errors caused by simultaneously transmitted streams of data having the same frequency tone. In a WCDMA embodiment, the receiver 10 corrects data transmission errors caused by simultaneously transmitted streams of data having the same channelization codes.

Regardless of the underlying access technology, the MIMO-based receiver 10 uses information garnered from decoded components constituting a received composite signal to facilitate decoding of the other components of the composite signal. Particularly, during the data decoding process, the receiver 10 removes the signal contribution associated with one or more received signal components from a corresponding received composite signal, thereby reducing decoding error rates. Removing a component of a composite signal cancels the signal contribution associated with that component from the remaining components of the composite signal. As such, the remaining signal components may then be decoded relatively free from the signal contribution of the removed component, thus enabling the receiver 10 to better cancel interference.

Generally, the receiver 10 corrects data transmission errors by regenerating one or more components, e.g., WCDMA or OFDM symbol streams of a received composite baseband signal and subtracting the regenerated components from the composite signal. To that end, a decoding quality metric is generated for the components of a received composite signal. The metric provides an indication as to the reliability or quality of the composite signal components. That is, the metric is used to determine whether a particular component is of sufficient quality such that its signal contribution may be reliably regenerated and removed from a composite signal. In some embodiments, the metric corresponds to a Cyclic Redundancy Check (CRC) value. In other embodiments, the metric corresponds to a Signal-to-Interference Ratio (SIR). In yet other embodiments, the metric corresponds to a dynamic range of demodulated soft bit values or decoded data values. Regardless of the particular metric used, the receiver 10 regenerates those signal components having a satisfactory metric. As such, if a particular signal component is not acceptably reliable, it is not regenerated. Thus, its corresponding signal contribution is not removed from the composite signal. A signal component may be regenerated even if it is not successfully decoded, so long as its corresponding decoding quality metric is satisfactory, e.g., above a defined threshold, which may be static or dynamic, and which may be stored as a configured value.

In some embodiments, a signal regenerator 18 included in or associated with a baseband processor 20 of the receiver 10 regenerates a signal component by first re-mapping soft bit values generated by a demodulator 22 back to symbol values, e.g., OFDM or WCDMA symbol values. In other embodiments, the signal regenerator 18 first re-encodes decoded data generated by a decoder 24 to soft bit values and then re-maps the soft bit values to symbol values. Regardless, a stream of re-mapped symbol values is then subsequently passed through a model of the wireless communication channel, thus subjecting the re-mapped symbol values to an approximation of the channel response as experienced by the corresponding originally transmitted data stream. By subjecting the re-mapped symbol values to a model of the channel response, the signal regenerator 18 approximates the signal contribution associated with the stream of re-mapped symbol values as originally received by the receiver 10.

Regenerated signal components are then removed from the composite signal to improve interference cancellation, e.g., by subtracting one or more regenerated streams of re-mapped symbol values from corresponding originally received symbol streams. As such, the contribution each regenerated signal component has on the originally received composite baseband signal is essentially cancelled. As a result, the receiver 10 may decode other data streams or re-decode previously unsuccessfully decoded data streams before requesting data retransmission.

If the receiver 10 is unable to decode some components of the composite signal after a predetermined number of regeneration and decoding attempts, the receiver 10 may then request data retransmission, e.g., in accordance with HARQ—Hybrid Automatic Repeat Request. Regardless of the particular retransmission scheme utilized by the receiver 10, the receiver 10 first attempts to decode unsuccessfully decoded data streams using regenerated signal components before invoking a data retransmission protocol. As such, the receiver 10 reduces the amount of data that is re-transmitted for error correction, thus improving performance.

Turning to the operational details of the MIMO-based receiver 10, the receiver 10 includes multiple receive antennas 12-16, a front end processor 26, memory 28, the baseband processor 20 and a post processor 30. Operation of the receiver 10 is next described with reference to OFDM access technology. However, those skilled in the art will readily recognize that the receiver 10 may correct data transmission errors associated with signals transmitted in accordance with other access technologies suitable for MIMO systems, e.g., WCDMA. With this in mind, the antennas 12-16 each receives an OFDM signal $Y_i(t)$ where i corresponds to the number of receive antennas. Each OFDM signal may comprise multiple streams of OFDM symbols, the symbols having been previously transformed by a transmitter (not shown), e.g., by using an Inverse Fast Fourier Transform (IFFT) and simultaneously transmitted over a rich multi-path fading channel environment via a plurality of transmit antennas (not shown). At the receiver 10, the transmitted OFDM symbol streams arrive superimposed at each receive antenna 12-16. As such, a received composite OFDM signal Y(t) may comprise various instances of the same OFDM symbol streams.

The front end processor 26 breaks down received signals into corresponding OFDM signal streams $Y_i[k,n]$ using a Fast Fourier Transform (FFT) as given by:

$$Y_i(k, n) = \sum_{j=0}^{M} H_{i,j}(k, n) S_j(k, n) + N_i(k, n), \quad (1)$$
$$0 \leq i \leq N_{rx} - 1$$

where j denotes the j-th transmitted OFDM signal stream having a block $S_j(k,n)$ of N symbols, $H_{i,j}(k,n)$ is the channel impulse response, and $N_i(k,n)$ is the inter-cell interference. The sum of the received OFDM signal streams forms a composite baseband signal $Y[k,n]$, where k denotes the sub-carrier frequency (tone), and n denotes the OFDM symbol. The components $Y_i[k,n]$ of the composite baseband signal are stored in memory 28 for subsequent use.

Figure 2:
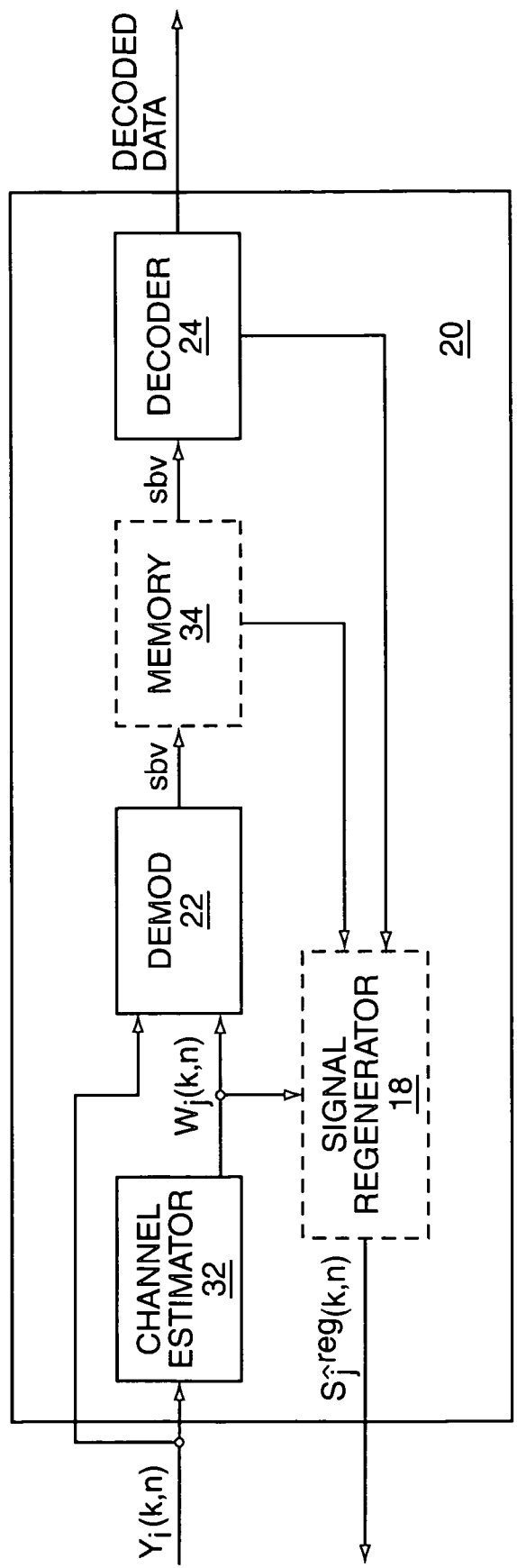
FIG. 2 is a block diagram of an embodiment of a baseband processor included in the MIMO-based wireless communication receiver illustrated in FIG. 1.

The baseband processor 20, the details of which are illustrated in FIG. 2, includes a channel estimator 32 that models the multi-path fading channel environment through which signals are received. The channel estimator 32 also generates demodulation weighting factors $W_j(k,n)$ based on the channel model as given by:

$$W_{\hat{j}}(k,n) = R_{\hat{j}}(k,n)^{-1} H_{\hat{j}}^{est}(k,n) \quad (2)$$

where $R_{\hat{j}}(k,n)^{-1}$ is an impairment covariance matrix, e.g., a noise and interference covariance matrix or a pilot de-spread value matrix and $H_{\hat{j}}^{est}(k,n)$ is an estimate of the channel response associated with the multi-path fading channel environment. The impairment covariance matrix is given by:

$$R_{i1,i2}^{\hat{j}}(k,n) = E\big(\big(Y_{i1}^{\Lambda}(k,n) - H_{i1,j}^{est}(k,n) S_j(k,n)\big) \cdot \quad (3)$$
$$\big(Y_{i2}^{\Lambda}(k,n) - H_{i2,j}^{est}(k,n) S_j(k,n)\big)^* \big| S_j(k,n)\big)$$
$$= \sum_{j \notin \{\hat{j},\Lambda\}} H_{i1,j}^{est}(k,n) \big(H_{i2,j}^{est}(k,n)\big)^* + \quad (4)$$
$$\sum_{j \in \Lambda} \big(1 - \gamma \big(H_{i1,j}^{est}(k,n) \big(H_{i2,j}^{est}(k,n)\big)^* + $$
$$R_{i1,i2}^{noise}(k,n)$$

where E is an expectation value and $Y_i^{\Lambda}(k,n)$ refers to the received signal component that has been modified by removal of OFDM streams contained in the set $\Lambda$. The first term in the impairment covariance matrix models the influence of the remaining OFDM symbol streams and the second term models those parts of the regenerated OFDM symbol streams not fully subtracted from the composite baseband signal. The parameter $\gamma$ is tunable, as will be described in detail later, and may be used to weight the regenerated OFDM symbol streams based on the reliability of the decoding quality metrics, e.g., the less reliable the metric, the lower the weight and vice-versa.

Figure 3:
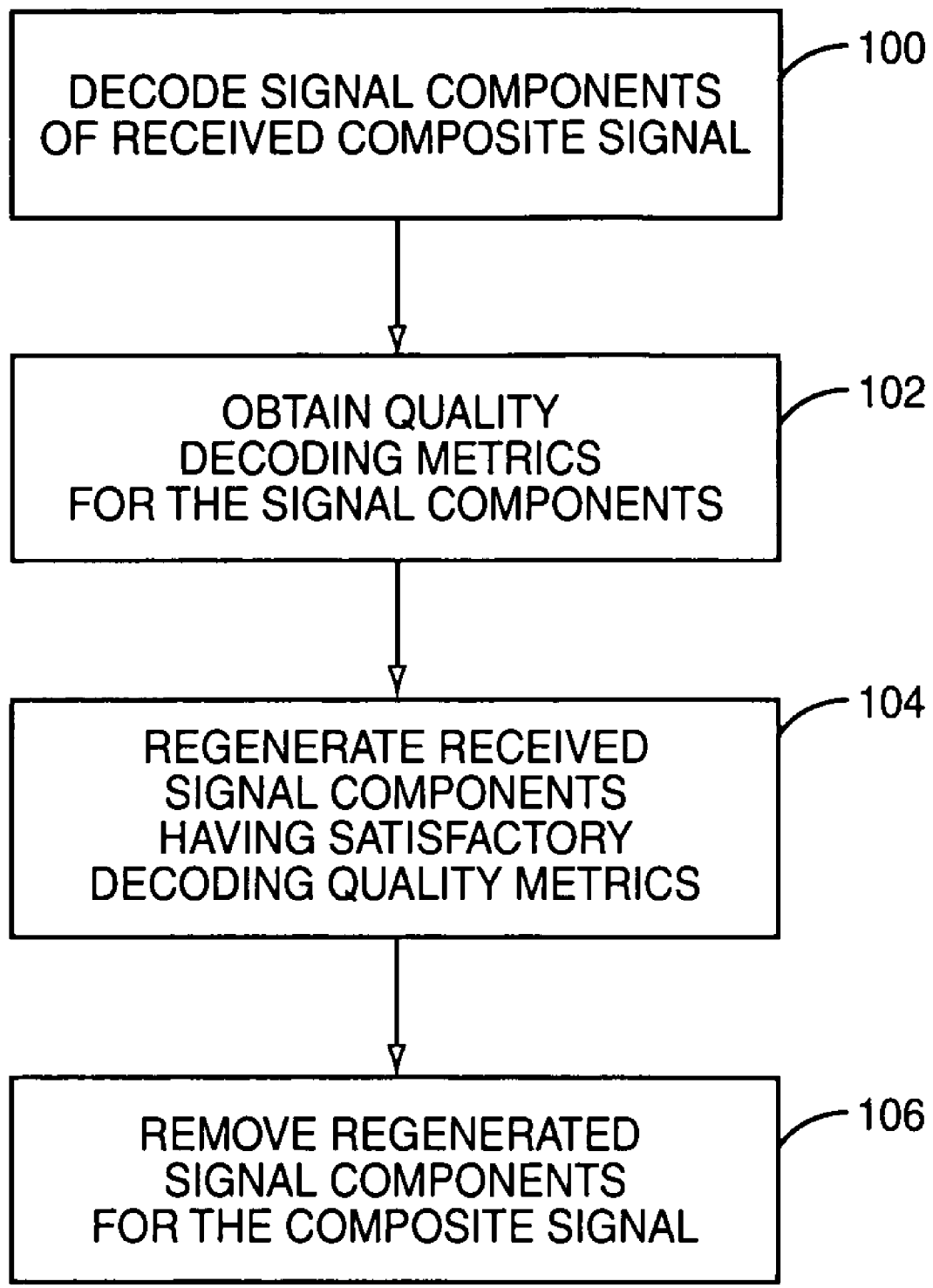
FIG. 3 is a logic flow diagram of one embodiment of processing logic for correcting data transmission errors by the MIMO-based receiver illustrated in FIG. 1.

The demodulator 22 included in the baseband processor 20 produces soft bit values (sbv) by demodulating received OFDM symbol streams in response to the weighting factors $W_j(k,n)$ and the decoder 24, e.g., a turbo decoder generates decoded data streams from the soft bit values, as illustrated by Step 100 of FIG. 3. The demodulator 22 produces soft bit values by first generating soft symbol values $S_{\hat{j}}^{est}(k,n)$ using the impairment covariance matrix as given by:

$$S_{\hat{j}}^{est}(k,n) = (W_{\hat{j}}(k,n))^H Y(k,n) \quad (5)$$

The demodulator 22 then converts the soft symbol values to soft bit values. The soft bit values are stored in a memory 34 included in or associated with the baseband processor 20. If the same block of OFDM symbols had been previously transmitted, the new soft bit values may be added to the corresponding old ones and the result saved to memory 34.

In addition to demodulating and decoding OFDM symbol streams, the baseband processor 20 also generates decoding quality metrics for use in determining which received OFDM symbol streams should be regenerated, as illustrated by Step 102 of FIG. 3. In one embodiment, the metric corresponds to a Signal-to-Interference Ratio (SIR) as given by:

$$SIR^{\hat{j}}(k,n) = \big(H_{\hat{j}}^{est}(k,n)\big)^H \big(R^{\hat{j}}(k,n)\big)^{-1} H_{\hat{j}}^{est}(k,n) \quad (6)$$

In another embodiment, the metric is given by the SIR averaged over the tones and symbols corresponding to the transmission of a complete block from stream $\hat{j}$, that is, $$SIR^{\hat{j}} = \frac{1}{|I_{\hat{j}}|} \sum_{(k,n) \in I_{\hat{j}}} \log(SIR^{\hat{j}}(k,n)) \quad (7)$$

where $I_{\hat{j}}$ is the index set containing the sub-carriers/tones, k, and time indexes, n, corresponding to stream $\hat{j}$ for a given block. Here, $|I_{\hat{j}}|$ denotes the number of elements in the set $I_{\hat{j}}$. Alternatively, $$SIR^{\hat{j}} = \frac{1}{|I_{\hat{j}}|} \sum_{(k,n) \in I_{\hat{j}}} SIR^{\hat{j}}(k,n) \quad (8)$$

In other embodiments, the metric corresponds to a dynamic range of demodulated soft bit values or decoded data values. That is, both the soft bit values and the decoded data values have a predetermined precision, e.g., between −8 and +8 for soft bit values and between −20 and +20 for decoded data values. The more positive the precision, the more likely a soft bit value or decoded data value represents a positive one. The more negative the precision, the more likely the value represents a negative one. As such, even though an OFDM symbol may be erroneously decoded, e.g., its Cyclic Redundancy Check (CRC) value fails, the precision associated with either its corresponding soft bit values or decoded data values may be used as an indication of the reliability of the received symbol. In other embodiments, the decoding quality metric corresponds to CRC values, i.e., whether a particular OFDM symbol was correctly decoded.

Regardless of the particular decoding quality metric used, the signal regenerator 18 regenerates one or more received OFDM symbol streams that satisfy the decoding quality metric, as illustrated by Step 104 of FIG. 3. In some embodiments, only successfully decoded OFDM data streams are regenerated. In other embodiments, soft bit values or decoded data values associated with unsuccessfully decoded OFDM data streams are regenerated. Regardless, signal interference may be cancelled by removing the signal contribution associated with one or more regenerated OFDM symbol streams from corresponding components of the received composite baseband signal, as illustrated by Step 106 of FIG. 3.

Figure 4:
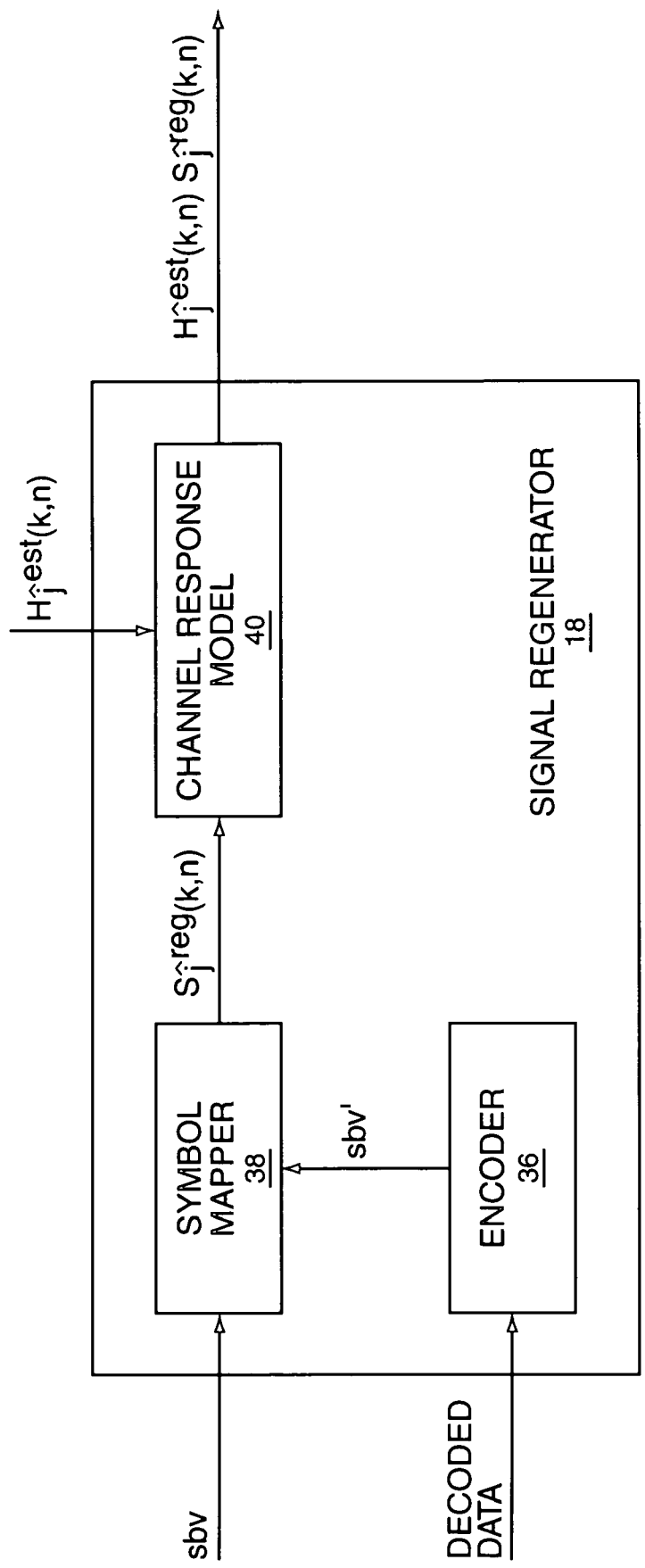
FIG. 4 is a block diagram of an embodiment of a signal regenerator included the MIMO-based receiver illustrated in FIG. 1.

FIG. 4 illustrates one embodiment of the signal regenerator 18 included in or associated with the baseband processor 20.

The signal regenerator 18 may regenerate a received OFDM symbol stream regardless of whether the stream was successfully decoded. In one embodiment, an encoder 36 re-encodes correctly or incorrectly decoded OFDM symbol streams as soft bit values (sbv') and a symbol mapper 38 re-maps the re-encoded soft bit values to regenerated soft symbol values $S_j^{reg}(k,n)$. In another embodiment, soft bit values (sbv) associated with incorrectly decoded OFDM symbol streams are re-mapped by the symbol mapper 38 to form regenerated soft symbol values.

Regardless of whether correctly or incorrectly decoded OFDM data streams are regenerated, or both, the resulting regenerated soft symbol values are subjected to a model 40 of the multi-path fading channel environment from which the original signals were received. By subjecting regenerated soft symbol values to the channel response model 40, the signal regenerator 18 produces a signal $H_j^{est}(k,n)S_j^{reg}(k,n)$ that, for the regenerated signals, approximates the original signal components as received by the receiver 10. The baseband processor 20 then removes the signal contributions associated with the regenerated signals from a received composite signal by subtracting the regenerated signals from corresponding components of the composite signal as given by:

$$Y^{\{j,\Lambda\}}(k,n)=Y^{\Lambda}(k,n)-H_j^{est}(k,n)S_j^{reg}(k,n) \quad (9)$$

The subtraction illustrated in equation (9) is done for all k tones and n regenerated OFDM symbol blocks. When the regenerated received signal components are derived from incorrectly decoded OFDM data streams, the regenerated signals may be weighted in response to the decoding quality metric, thus reflecting the reliability or quality of the incorrectly decoded OFDM data streams. That is, equation (9) may be modified as given by:

$$Y^{\{j,\Lambda\}}(k,n)=Y^{\Lambda}(k,n)-\gamma \cdot H_j^{est}(k,n)S_j^{reg}(k,n) \quad (10)$$

where γ is a weighting factor corresponding to the reliability or quality of the incorrectly decoded OFDM data streams. For example, if the metric corresponds to soft bit value or decoded data value precision, γ corresponds to how reliable a particular bit precision is. The more reliable the bit precision, the greater the weight assigned, even if the associated OFDM symbol is decoded incorrectly. Conversely, the less reliable the bit precision, the lower the weight assigned. In one embodiment, $0 \leq \gamma \leq 1$.

Figure 5:
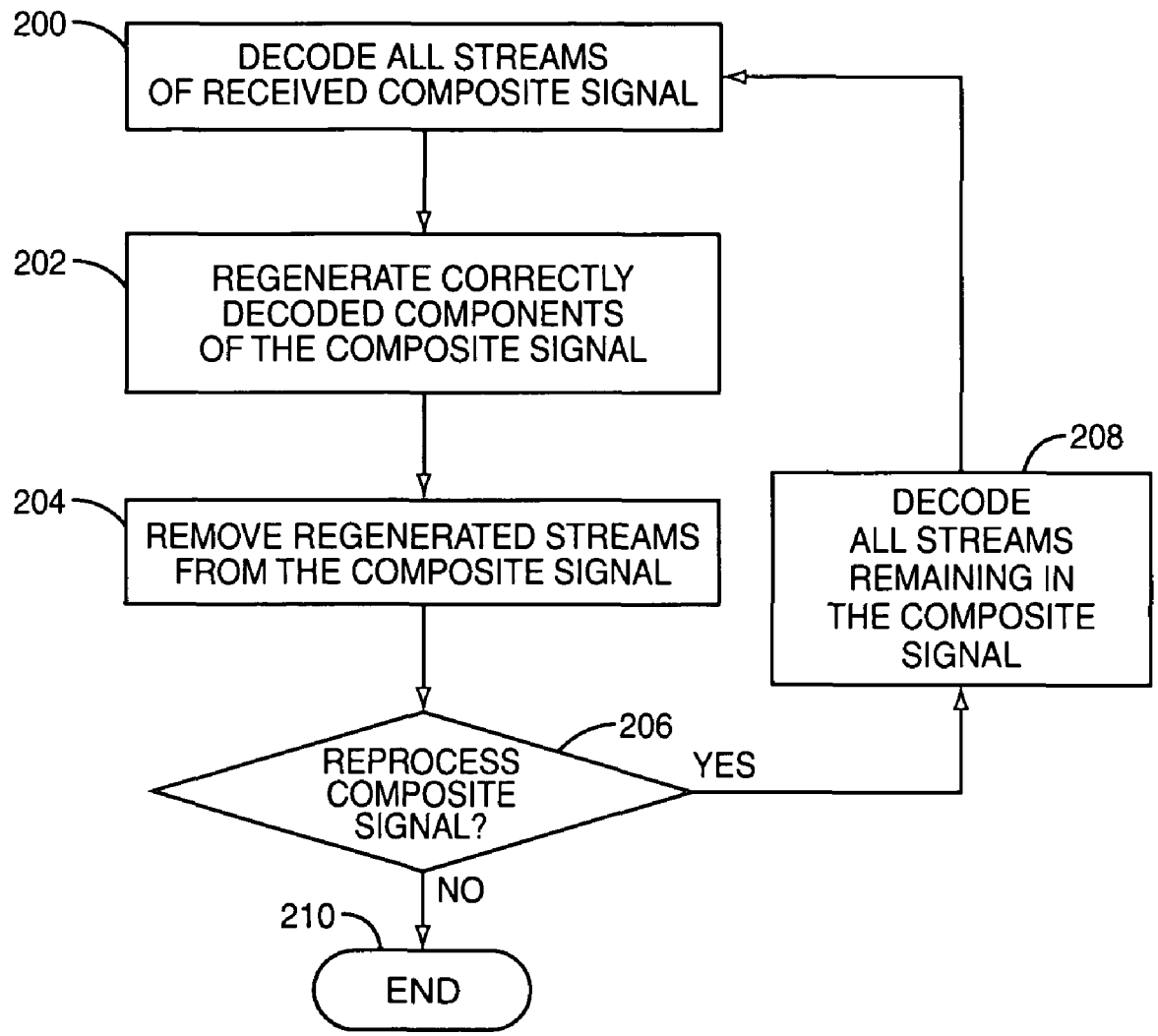
FIG. 5 is a logic flow diagram of another embodiment of processing logic for correcting data transmission errors by the MIMO-based receiver illustrated in FIG. 1.

With all of the above in mind, FIG. 5 illustrates a one embodiment of program logic that may be implemented by the MIMO-based receiver 10 for correcting data transmission errors. The program logic 'begins' with the baseband processor 20 decoding received OFDM signal streams constituting a received composite signal of interest (Step 200). Based on a decoding quality metric such as CRC values, the signal regenerator 18 regenerates only correctly decoded components of the received composite signal (Step 202). That is, only those OFDM symbols that are properly decoded as indicated by CRC verification are regenerated, e.g., by re-encoding decoded data values to soft bit values and then re-mapping the re-encoded soft bit values to regenerated symbol values. Continuing with the program logic, the baseband processor 20 removes the regenerated OFDM signal streams from the composite baseband signal by subtracting the regenerated symbol values from the composite signal (Step 204). At this point, the originally received composite signal may be replaced by the modified composite signal post removal of regenerated OFDM signal streams. As such, those OFDM symbol streams not properly decoded during the initial iteration may be re-decoded (Step 206). The receiver 10 may determine whether to re-decode the remaining streams based on various factors, e.g., a predetermined number of decoding iterations, decoding success rate, etc. Regardless of how the determination is made, if the baseband processor 20 initiates another re-decode, the OFDM symbol streams remaining in the composite signal are re-decoded (Step 208). The symbol streams re-decoded during a subsequent attempt are relatively free from the signal contributions associated with symbol streams removed during previous iterations. As such, it is more likely that previously incorrectly decoded OFDM symbol streams will be successfully decoded during subsequent iterations. The program logic ends when either all OFDM symbol streams constituting a composite signal of interest are correctly decoded or after a predetermined number of iterations (Step 210). Alternatively, the receiver 10 may be instructed to cease the iterative re-decoding process.

Figure 6:
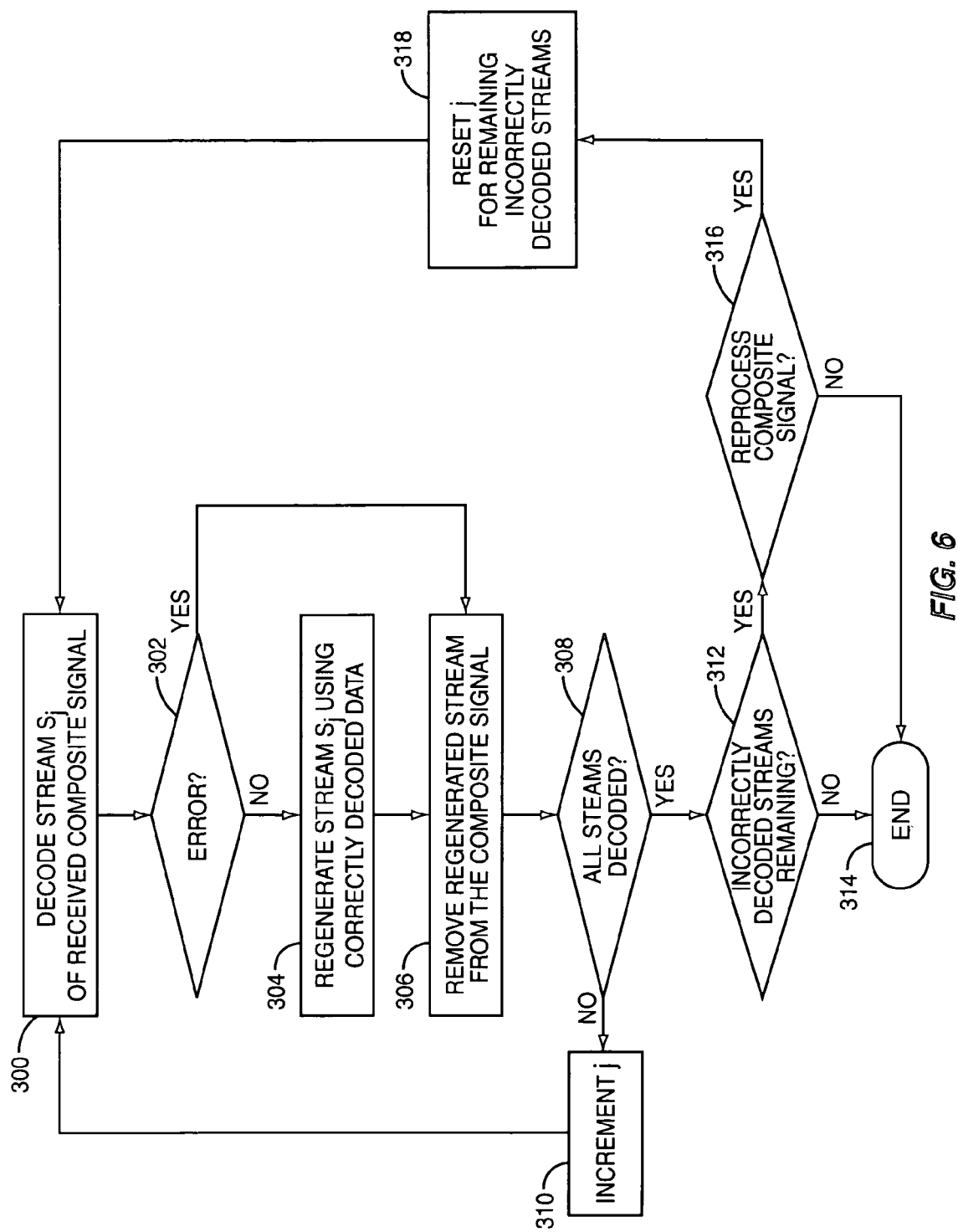
FIG. 6 is a logic flow diagram of yet another embodiment of processing logic for correcting data transmission errors by the MIMO-based receiver illustrated in FIG. 1.

FIG. 6 illustrates another embodiment of program logic that may be implemented by the receiver 10 for correcting data transmission errors. The baseband processor 20 decodes a first stream of OFDM symbols (Step 300) and then determines whether the first stream was decoded correctly (Step 302). The first OFDM symbol stream is regenerated only if it is correctly decoded (Step 304). If the first stream is regenerated, it is then removed from the composite signal by subtracting the regenerated stream from the composite signal (Step 306). This process continues for all streams that constitute the composite signal of interest (Steps 308 and 310). After all streams have been decoded once, the modified composite signal stored in memory 28 includes the OFDM symbol streams of interest that were incorrectly decoded during the initial iteration. Thus, baseband processor 20 then determines whether the modified composite signal includes any incorrectly decoded components (Step 312). If none exist, then the program logic ends (Step 314). If some incorrectly decoded components remain present in the modified composite baseband signal, the baseband processor 20 determines whether the remaining incorrectly decoded OFDM symbol streams are to be re-decoded (Step 316). If re-decoding is to occur, the OFDM stream index j is reset so that it properly indexes the symbol streams of interest remaining in the composite signal (Step 318) and the decoding process is repeated.

Figure 7:
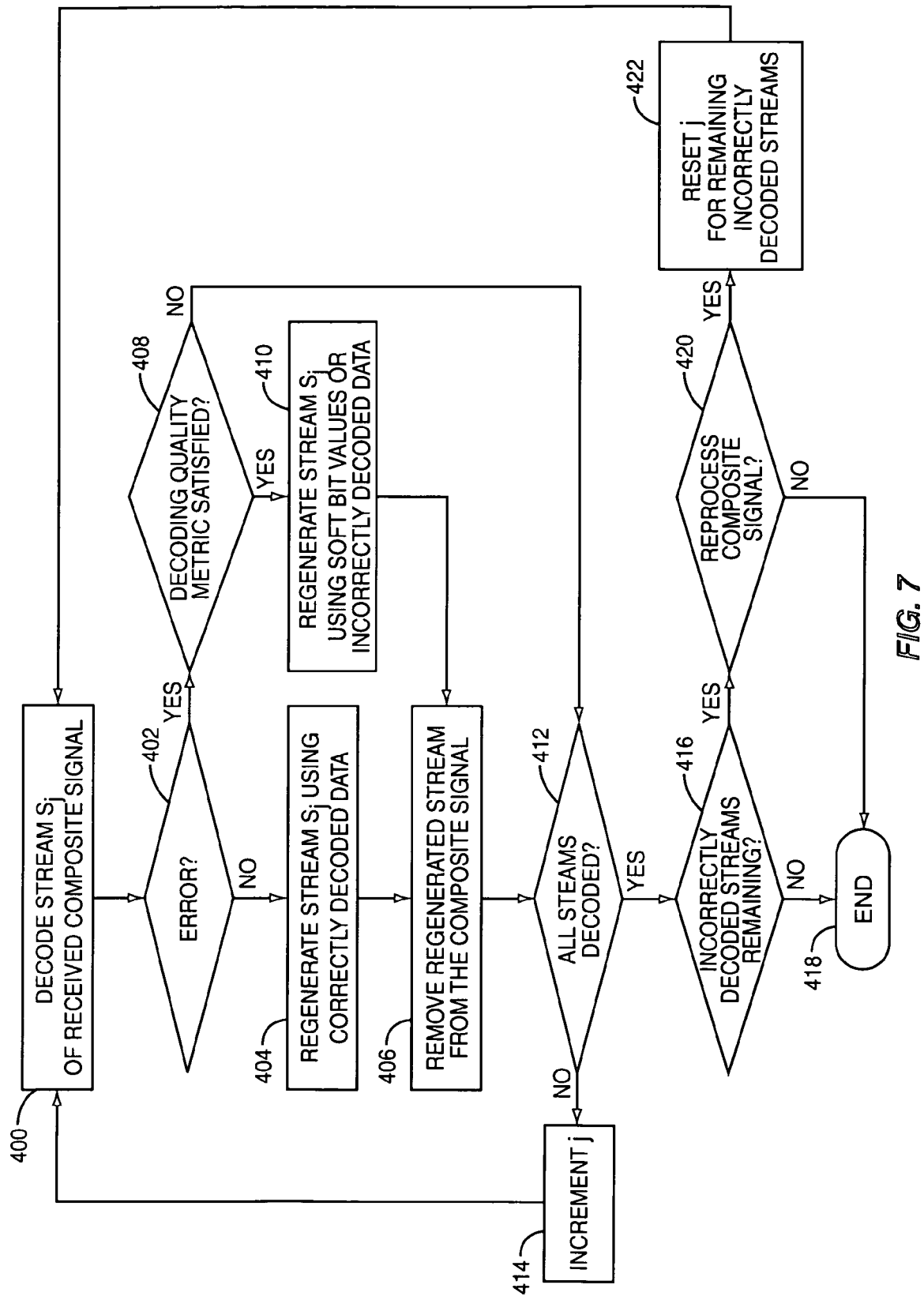
FIG. 7 is a logic flow diagram of still another embodiment of processing logic for correcting data transmission errors by the MIMO-based receiver illustrated in FIG. 1.

FIG. 7 illustrates yet another embodiment of program logic that may be implemented by the receiver 10 for correcting data transmission errors. The baseband processor 20 decodes a first stream of OFDM symbols (Step 400) and then determines whether the first stream is decoded correctly (Step 402). If the stream is decoded correctly, it is regenerated using the corresponding decoded data stream (Step 404) and removed from the composite baseband signal by subtracting the regenerated signal from the composite signal (Step 406). If the stream is incorrectly decoded, the baseband processor 20 determines whether a decoding quality metric, e.g., a dynamic range of soft bit values or decoded data values indicates that the stream may be reliably regenerated despite being incorrectly decoded (Step 408). If the decoding quality metric indicates that the incorrectly decoded stream may be reliably regenerated, the signal regenerator 18 does so (Step 410). Otherwise, the stream is not regenerated. The decoding process continues for all streams that constitute the composite signal of interest (Steps 412 and 414). After all streams have been initially decoded, the modified composite baseband signal stored in memory 28 comprises only those OFDM symbol streams incorrectly decoded and having an unreliable decoding quality metric. The baseband processor 20 then determines whether there are any incorrectly decoded components remaining (Step 416). If none exist, then the program logic ends (Step 418). If some incorrectly decoded components remain present in the modified composite baseband signal, the baseband processor 20 determines whether the remaining signal components are to be re-decoded (Step 420). If streams are to be re-decoded, the stream index j is reset so that it properly indexes those OFDM symbol streams to be re-decoded (Step 422) and the decoding process is repeated.

In summary, the MIMO-based receiver 10 presented herein corrects data transmission errors caused by the simultaneous transmission of multiple streams of data in a MIMO network. The receiver 10 corrects data transmission errors by removing the signal contribution associated with one or more received signal components from a corresponding received composite signal, thus allowing the remaining components to be decoded relatively free from the signal contribution of the removed components. The receiver 10 removes a component of a composite signal by regenerating the received component signal and subtracting the regenerated component signal from the composite signal. The receiver 10 determines which signal components to regenerate based on a decoding quality metric such as CRC values, SIR, or a dynamic range of demodulated soft bit values or decoded data values.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of correcting data transmission errors in a wireless communication device, the method comprising:
   demodulating and decoding a plurality of received signal components of a received composite signal;
   determining whether individual ones of the received signal components are decoded correctly;
   regenerating each received signal component which is decoded correctly;
   removing correctly decoded ones of the regenerated signal components from the received composite signal to form a modified composite signal which is relatively free from signal contributions associated with the correctly decoded signal components;
   determining whether any incorrectly decoded ones of the received signal components remain in the modified composite signal; and
   attempting to correctly re-decode, regenerate and remove previously incorrectly decoded ones of the received signal components from the modified composite signal.

2. The method of claim 1, wherein regenerating each received signal component which is decoded correctly comprises, in an initial iteration:
   obtaining decoded data streams from each of the received signal components; and
   forming a regenerated received signal component from each decoded data stream having a corresponding satisfactory decoding quality metric.

3. The method of claim 2, wherein removing correctly decoded ones of the regenerated signal components from the received composite signal comprises, in an initial iteration, subtracting each of the regenerated received signal components from the received composite signal to obtain the modified composite signal.

4. The method of claim 3, further comprising:
   obtaining subsequently decoded data streams from the modified composite signal; and
   obtaining revised decoding quality metrics for individual ones of the received signal components constituting the modified composite signal.

5. The method of claim 4, wherein attempting to correctly re-decode, regenerate and remove previously incorrectly decoded ones of the received signal components from the modified composite signal comprises, in one or more subsequent iterations, forming a subsequently regenerated received signal component from each subsequently decoded data stream having a corresponding satisfactory revised decoding quality metric.

6. The method of claim 5, wherein removing correctly decoded ones of the regenerated signal components from the received composite signal comprises, in one or more subsequent iterations, subtracting each of the subsequently regenerated received signal components from the modified composite signal to obtain a subsequently modified composite signal.

7. The method of claim 1, wherein regenerating each received signal component which is decoded correctly comprises, in an initial iteration, forming a first regenerated received signal component for a first selected one of the received signal components having a satisfactory decoding quality metric.

8. The method of claim 7, wherein removing correctly decoded ones of the regenerated signal components from the received composite signal comprises, in an initial iteration, subtracting the first regenerated received signal component from the composite signal to obtain the modified composite signal.

9. The method of claim 8, further comprising obtaining revised decoding quality metrics for individual ones of the received signal components constituting the modified composite signal.

10. The method of claim 9, wherein attempting to correctly re-decode, regenerate and remove previously incorrectly decoded ones of the received signal components from the modified composite signal comprises, in one or more subsequent iterations, forming a subsequently regenerated received signal component for a first one of the received signal components constituting the modified composite signal and having a corresponding satisfactory revised decoding quality metric.

11. The method of claim 10, wherein removing correctly decoded ones of the regenerated signal components from the received composite signal comprises, in one or more subsequent iterations, subtracting the subsequently regenerated received signal component from the modified composite signal to obtain a subsequently modified composite signal.

12. The method of claim 1, wherein one of a cyclic redundancy check value, a signal-to-interference ratio, a dynamic range of soft bit values, and a dynamic range of decoded data values is used to determine whether each of the received signal components is decoded correctly.

13. The method of claim 1, further comprising weighting the regenerated received signal components based on a decoding quality metric used to determine whether each of the received signal components is decoded correctly.

14. The method of claim 1, further comprising weighting the regenerated received signal components that correspond to improperly decoded ones of the received signal components.

15. The method of claim 1, wherein the received composite signal comprises one of an orthogonal frequency division multiplexed signal and a wideband code division multiple access signal.

16. A wireless communication device comprising:
   a plurality of antennas configured to receive a composite signal having a plurality of received signal components; and a baseband processor configured to demodulate and decode the plurality of received signal components, to determine whether individual ones of the received signal components are decoded correctly, to regenerate each received signal component which is decoded correctly, to remove correctly decoded ones of the regenerated signal components from the received composite signal to form a modified composite signal which is relatively free from signal contributions associated with the correctly decoded signal components, to determine whether any incorrectly decoded ones of the received signal components remain in the modified composite signal, and to attempt to correctly re-decode, regenerate and remove previously incorrectly decoded ones of the received signal components from the modified composite signal.

17. The wireless communication device of claim 16, wherein the baseband processor is configured to regenerate each received signal component which is decoded correctly by, in an initial iteration, obtaining decoded data streams from each of the received signal components and forming a regenerated received signal component from each decoded data stream having a corresponding satisfactory decoding quality metric.

18. The wireless communication device of claim 17, wherein the baseband processor is configured to remove correctly decoded ones of the regenerated signal components from the received composite signal by, in an initial iteration, subtracting each of the regenerated received signal components from the composite signal to obtain the modified composite signal.

19. The wireless communication device of claim 18, wherein the baseband processor is further configured to obtain subsequently decoded data streams from the received signal components constituting the modified composite signal and to obtain revised decoding quality metrics for individual ones of the received signal components constituting the modified composite signal.

20. The wireless communication device of claim 19, wherein the baseband processor is configured to attempt to correctly re-decode, regenerate and remove previously incorrectly decoded ones of the received signal components from the modified composite signal by, in one or more subsequent iterations, forming a subsequently regenerated received signal component from each subsequently decoded data stream having a corresponding satisfactory revised decoding quality metric.

21. The wireless communication device of claim 20, wherein the baseband processor is configured to remove correctly decoded ones of the regenerated signal components from the received composite signal by, in one or more subsequent iterations, subtracting each of the subsequently regenerated received signal components from the modified composite signal to obtain a subsequently modified composite signal.

22. The wireless communication device of claim 16, wherein the baseband processor is configured to regenerate each received signal component which is decoded correctly by, in an initial iteration, forming a first regenerated received signal component for a first selected one of the received signal components having a satisfactory decoding quality metric.

23. The wireless communication device of claim 22, wherein the baseband processor is configured to remove correctly decoded ones of the regenerated signal components from the received composite signal by, in an initial iteration, subtracting the first regenerated received signal component from the composite signal to obtain the modified composite signal.

24. The wireless communication device of claim 23, wherein the baseband processor is further configured to obtain revised decoding quality metrics for individual ones of the received signal components constituting the modified composite signal.

25. The wireless communication device of claim 24, wherein the baseband processor is configured to attempt to correctly re-decode, regenerate and remove previously incorrectly decoded ones of the received signal components from the modified composite signal by, in one or more subsequent iterations, forming a subsequently regenerated received signal component for a first one of the received signal components constituting the modified composite signal and having a corresponding satisfactory revised decoding quality metric.

26. The wireless communication device of claim 25, wherein the baseband processor is configured to remove correctly decoded ones of the regenerated signal components from the received composite signal by, in one or more subsequent iterations, subtracting the subsequently regenerated received signal component from the modified composite signal to obtain a subsequently modified composite signal.

27. The wireless communication device of claim 16, wherein the baseband processor is configured to use at least one of a cyclic redundancy check value, a signal-to-interference ratio, a dynamic range of soft bit values, and a dynamic range of decoded data values to determine whether each of the received signal components is decoded correctly.

28. The wireless communication device of claim 16, wherein the baseband processor is further configured to weight the regenerated received signal components based on a decoding quality metric used to-determine whether each of the received signal components is decoded correctly.

29. The wireless communication device of claim 16, wherein the baseband processor comprises:
    a demodulator configured to generate soft bit values by demodulating the received signal components;
    a decoder configured to generate decoded data values by decoding the soft bit values; and
    a signal regenerator configured to obtain decoding quality metrics for individual ones of the received signal components, to regenerate each received signal component which is decoded correctly as indicated by the decoding quality metrics, and to remove the regenerated received signal components from the received composite signal.

30. The wireless communication device of claim 16, wherein the baseband processor is further configured to weight the regenerated received signal components that correspond to improperly decoded ones of the received signal components.

31. The wireless communication device of claim 16, wherein the received composite signal comprises one of an orthogonal frequency division multiplexed signal and a wideband code division multiple access signal.

* * * * *